US011696269B2

(12) United States Patent
Kwak et al.

(10) Patent No.: US 11,696,269 B2
(45) Date of Patent: Jul. 4, 2023

(54) UPLINK CHANNEL REPETITIONS WITH INTER-BWP FREQUENCY HOPPING

(71) Applicant: QUALCOMM Incorporated, San Diego, CA (US)

(72) Inventors: Yongjun Kwak, San Diego, CA (US); Jing Lei, San Diego, CA (US); Huilin Xu, Temecula, CA (US); Yuchul Kim, San Diego, CA (US); Hwan Joon Kwon, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 133 days.

(21) Appl. No.: 17/224,029

(22) Filed: Apr. 6, 2021

(65) Prior Publication Data

US 2022/0322345 A1 Oct. 6, 2022

(51) Int. Cl.
*H04L 12/28* (2006.01)
*H04W 72/0453* (2023.01)
*H04J 1/16* (2006.01)

(52) U.S. Cl.
CPC .............................. *H04W 72/0453* (2013.01)

(58) Field of Classification Search
CPC ....... H04B 1/713; H04L 5/001; H04L 5/0012; H04W 72/0446; H04W 72/0453; H04W 72/1268

(Continued)

(56) References Cited

U.S. PATENT DOCUMENTS

2020/0106559 A1  4/2020  Vilaipornsawai et al.
2020/0107356 A1  4/2020  Rico Alvarino et al.
(Continued)

FOREIGN PATENT DOCUMENTS

WO  WO-2020033785 A1   2/2020
WO  WO-2020222299 A1  11/2020

OTHER PUBLICATIONS

International Search Report and Written Opinion—PCT/US2022/071142—ISA/EPO—dated Jul. 1, 2022 (2102771WO).

(Continued)

*Primary Examiner* — John Pezzlo
(74) *Attorney, Agent, or Firm* — Qualcomm/Norton Rose Fulbright US LLP; Kevin T. Cheatham

(57) ABSTRACT

This disclosure provides systems, methods, and devices for wireless communication that support inter-slot bundling and frequency hopping. In a first aspect, a method of wireless communication includes receiving a message indicating inter-slot bundling for uplink channel inter-bandwidth part (BWP) frequency hopping repetitions. The method also includes receiving bundling information and redundancy value (RV) information for an uplink channel transmission and corresponding uplink channel transmission repetitions. The method includes transmitting the uplink channel transmission with inter-slot bundling and frequency hopping and based on the bundling information and the RV information. The method further include transmitting an uplink channel transmission repetition of the uplink channel transmission with inter-slot bundling and frequency hopping and based on the bundling information and the RV information. Other aspects and features are also claimed and described.

30 Claims, 12 Drawing Sheets

(58) Field of Classification Search
USPC .................................. 370/252, 329, 430, 442
See application file for complete search history.

(56) References Cited

U.S. PATENT DOCUMENTS

| | | | | |
|---|---|---|---|---|
| 2020/0383105 A1* | 12/2020 | Park | ...................... | H04L 1/1819 |
| 2021/0282137 A1* | 9/2021 | Wang | ................ | H04W 72/0446 |
| 2021/0360616 A1* | 11/2021 | Yi | ...................... | H04W 72/0413 |
| 2022/0015187 A1* | 1/2022 | Huang | .................. | H04W 72/23 |
| 2022/0225360 A1* | 7/2022 | Yi | ......................... | H04W 72/21 |

OTHER PUBLICATIONS

ZTE, et al., "Remaining Issues for UL Data Transmission Procedure", 3GPP TSG RAN WG1 Meeting #92bis, R1-1803797, 3GPP, Mobile Competence Centre, 650, Route Des Lucioles, F-06921 Sophia-Antipolis Cedex, France, vol. RAN WG1, No. Sanya, China, Apr. 16, 2018-Apr. 20, 2018, 8 Pages, Apr. 15, 2018, XP051426092, URL: http://www.3gpp.org/ftp/Meetings%5F3GPP%5FSYNC/RAN1/Docs/.

* cited by examiner $$RB_{start}(n) = \begin{cases} RB_{start} & \lfloor n/N_{Bundle}^{size}\rfloor \bmod 2 = 0 \\ (RB_{start} + RB_{offset}) \bmod N_{BWP}^{size} & \lfloor n/N_{Bundle}^{size}\rfloor \bmod 2 = 1 \end{cases}$$

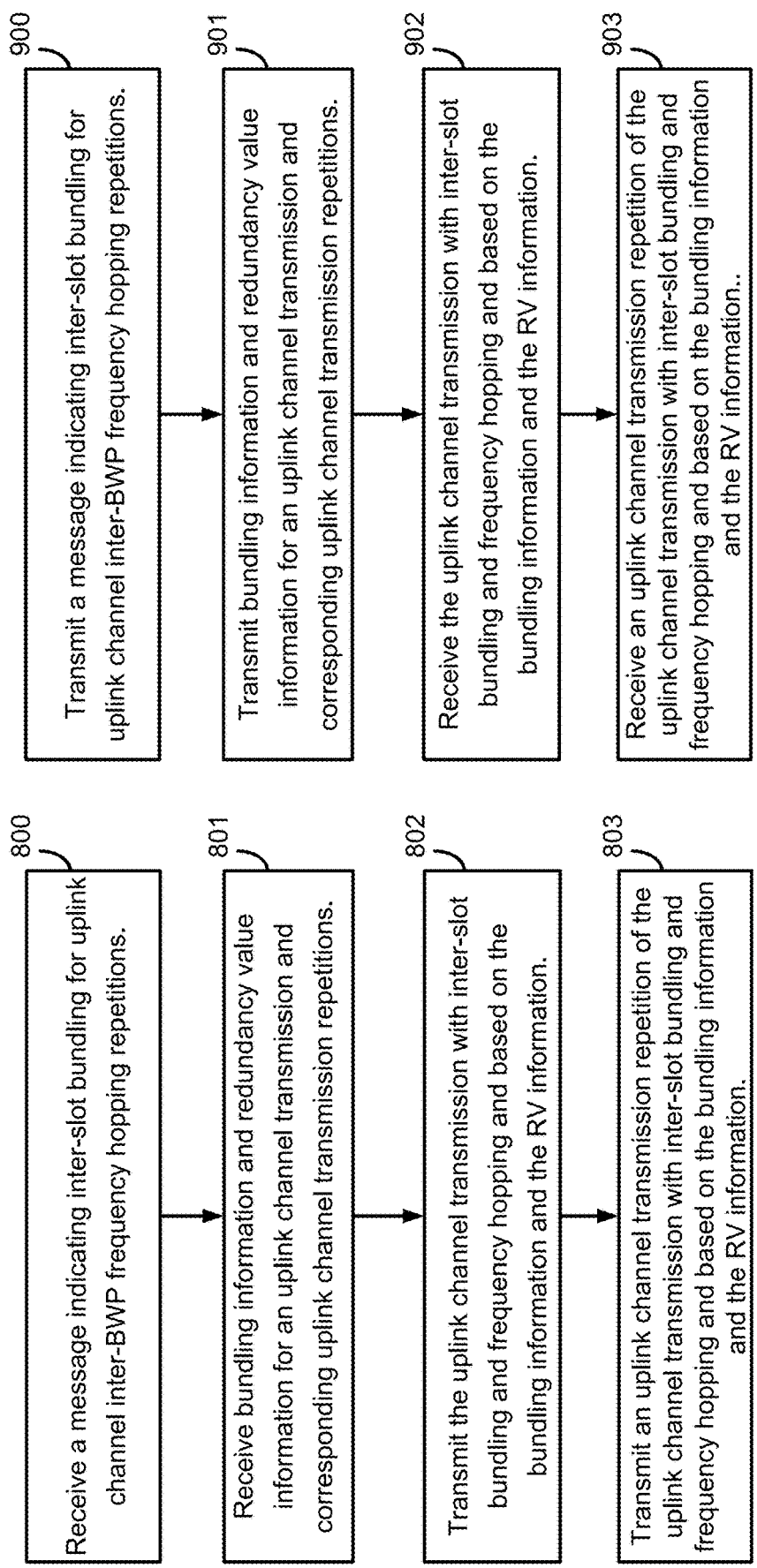

UPLINK CHANNEL REPETITIONS WITH INTER-BWP FREQUENCY HOPPING

BACKGROUND

Field

Aspects of the present disclosure relate generally to wireless communication systems, and more particularly, to transmission bundling and frequency hopping.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a wireless communication device, a message indicating inter-slot bundling for uplink channel inter-bandwidth part (BWP) frequency hopping repetitions; receiving, by the wireless communication device, bundling information and redundancy value (RV) information for an uplink channel transmission and corresponding uplink channel transmission repetitions; transmitting, by the wireless communication device, the uplink channel transmission with inter-slot bundling and frequency hopping and based on the bundling information and the RV information; and transmitting, by the wireless communication device, an uplink channel transmission repetition of the uplink channel transmission with inter-slot bundling and frequency hopping and based on the bundling information and the RV information.

In an additional aspect of the disclosure, an apparatus configured for wireless communication is disclosed. The apparatus includes at least one processor, and a memory coupled to the processor. The at least one processor is configured to execute instructions stored on the memory that cause the apparatus to receive a message indicating inter-slot bundling for uplink channel inter-bandwidth part (BWP) frequency hopping repetitions; receive bundling information and redundancy value (RV) information for an uplink channel transmission and corresponding uplink channel transmission repetitions; transmit the uplink channel transmission with inter-slot bundling and frequency hopping and based on the bundling information and the RV information; and transmit an uplink channel transmission repetition of the uplink channel transmission with inter-slot bundling and frequency hopping and based on the bundling information and the RV information.

In an additional aspect of the disclosure, a non-transitory computer-readable medium having program code recorded thereon. The program code further includes code to receive, by a wireless communication device, a message indicating inter-slot bundling for uplink channel inter-bandwidth part (BWP) frequency hopping repetitions; receive, by the wireless communication device, bundling information and redundancy value (RV) information for an uplink channel transmission and corresponding uplink channel transmission repetitions; transmit, by the wireless communication device, the uplink channel transmission with inter-slot bundling and frequency hopping and based on the bundling information and the RV information; and transmit, by the wireless communication device, an uplink channel transmission repetition of the uplink channel transmission with inter-slot bundling and frequency hopping and based on the bundling information and the RV information.

In an additional aspect of the disclosure, an apparatus configured for wireless communication is disclosed. The apparatus includes means for receiving a message indicating inter-slot bundling for uplink channel inter-bandwidth part (BWP) frequency hopping repetitions; means for receiving bundling information and redundancy value (RV) information for an uplink channel transmission and corresponding uplink channel transmission repetitions; means for transmitting the uplink channel transmission with inter-slot bundling and frequency hopping and based on the bundling information and the RV information; and means for transmitting an uplink channel transmission repetition of the uplink channel transmission with inter-slot bundling and frequency hopping and based on the bundling information and the RV information.

In another aspect of the disclosure, a method of wireless communication includes transmitting, by a wireless communication device, a message indicating inter-slot bundling for uplink channel inter-bandwidth part (BWP) frequency hopping repetitions; transmitting, by the wireless communication device, bundling information and redundancy value (RV) information for an uplink channel transmission and corresponding uplink channel transmission repetitions; receiving, by the wireless communication device, the uplink channel transmission with inter-slot bundling and frequency hopping and based on the bundling information and the RV information; and receiving, by the wireless communication device, an uplink channel transmission repetition of the uplink channel transmission with inter-slot bundling and frequency hopping and based on the bundling information and the RV information.

In an additional aspect of the disclosure, an apparatus configured for wireless communication is disclosed. The apparatus includes at least one processor, and a memory coupled to the processor. The at least one processor is configured to execute instructions stored on the memory that cause the apparatus to transmit a message indicating inter-slot bundling for uplink channel inter-bandwidth part (BWP) frequency hopping repetitions; transmit bundling information and redundancy value (RV) information for an uplink channel transmission and corresponding uplink channel transmission repetitions; receive the uplink channel transmission with inter-slot bundling and frequency hopping and based on the bundling information and the RV information; and receive an uplink channel transmission repetition of the uplink channel transmission with inter-slot bundling and frequency hopping and based on the bundling information and the RV information.

In an additional aspect of the disclosure, a non-transitory computer-readable medium having program code recorded thereon. The program code further includes code to transmit, by a wireless communication device, a message indicating inter-slot bundling for uplink channel inter-bandwidth part (BWP) frequency hopping repetitions; transmit, by the wireless communication device, bundling information and redundancy value (RV) information for an uplink channel transmission and corresponding uplink channel transmission repetitions; receive, by the wireless communication device, the uplink channel transmission with inter-slot bundling and frequency hopping and based on the bundling information and the RV information; and receive, by the wireless communication device, an uplink channel transmission repetition of the uplink channel transmission with inter-slot bundling and frequency hopping and based on the bundling information and the RV information.

In an additional aspect of the disclosure, an apparatus configured for wireless communication is disclosed. The apparatus includes means for transmitting a message indicating inter-slot bundling for uplink channel inter-bandwidth part (BWP) frequency hopping repetitions; means for transmitting bundling information and redundancy value (RV) information for an uplink channel transmission and corresponding uplink channel transmission repetitions; means for receiving the uplink channel transmission with inter-slot bundling and frequency hopping and based on the bundling information and the RV information; and means for receiving an uplink channel transmission repetition of the uplink channel transmission with inter-slot bundling and frequency hopping and based on the bundling information and the RV information.

In another aspect of the disclosure, a method of wireless communication includes receiving, by a wireless communication device, a message indicating inter-slot bundling for uplink channel inter-BWP frequency hopping repetitions; receiving, by the wireless communication device, bundling information and redundancy value information for an uplink channel transmission and corresponding uplink channel transmission repetitions; transmitting, by the wireless communication device, a first bundled transmission based on the bundling information and the RV information; and transmitting, by the wireless communication device, a second bundled transmission based on the bundling information and the RV information.

In yet another aspect of the disclosure, transmitting a method of wireless communication includes, by a wireless communication device, a message indicating inter-slot bundling for uplink channel inter-BWP frequency hopping repetitions; transmitting, by the wireless communication device, bundling information and redundancy value information for an uplink channel transmission and corresponding uplink channel transmission repetitions; receiving, by the wireless communication device, a first bundled transmission based on the bundling information and the RV information; and receiving, by the wireless communication device, a second bundled transmission based on the bundling information and the RV information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a flow diagram illustrating an example process that supports use of inter-slot bundling with frequency hopping operations according to one or more aspects.

FIG. 9 is a flow diagram illustrating an example process that supports use of inter-slot bundling with frequency hopping operations according to one or more aspects.

DETAILED DESCRIPTION

Figure 1:
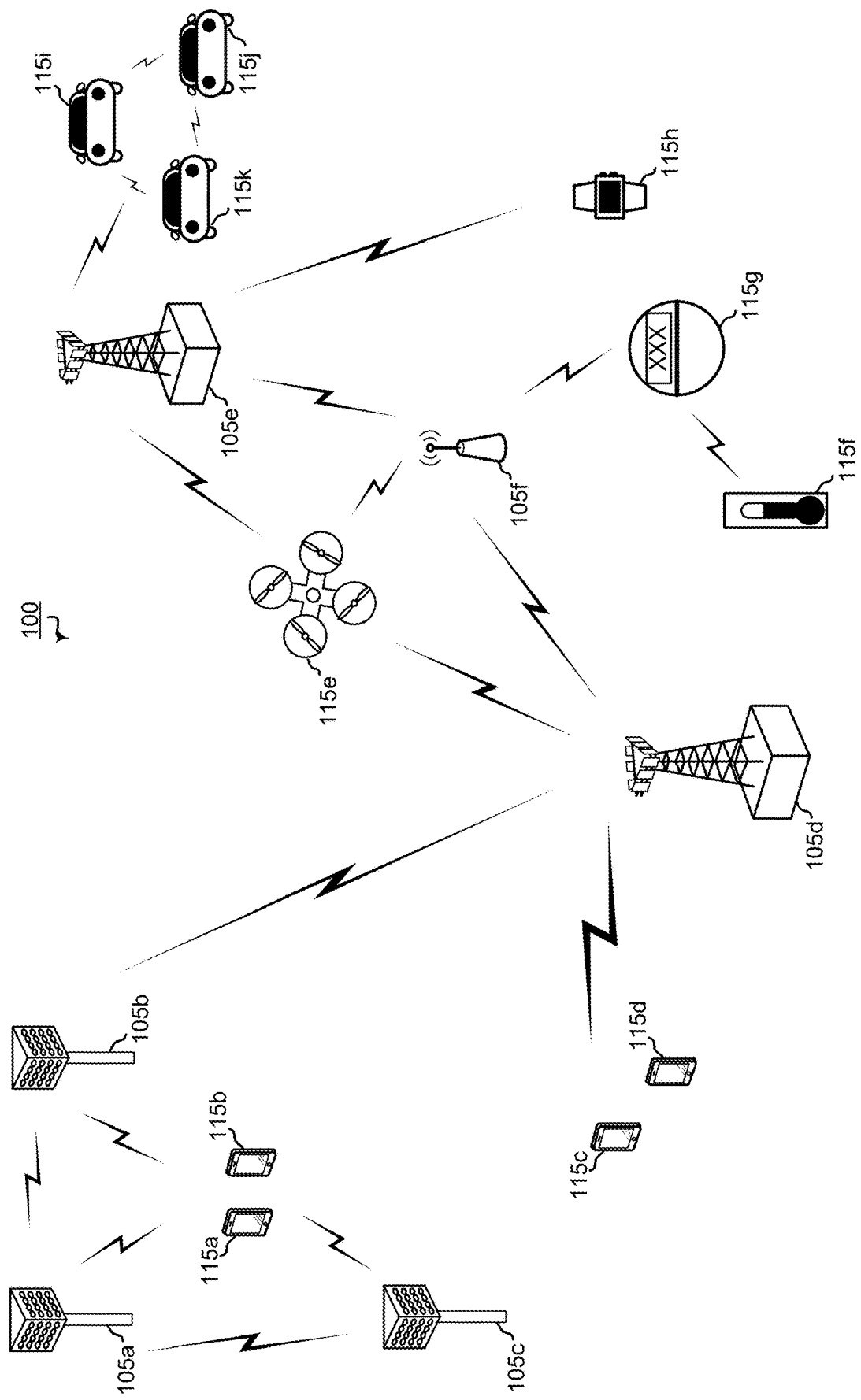
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., —99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports inter-slot bundling and frequency hopping in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μLBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmWave receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
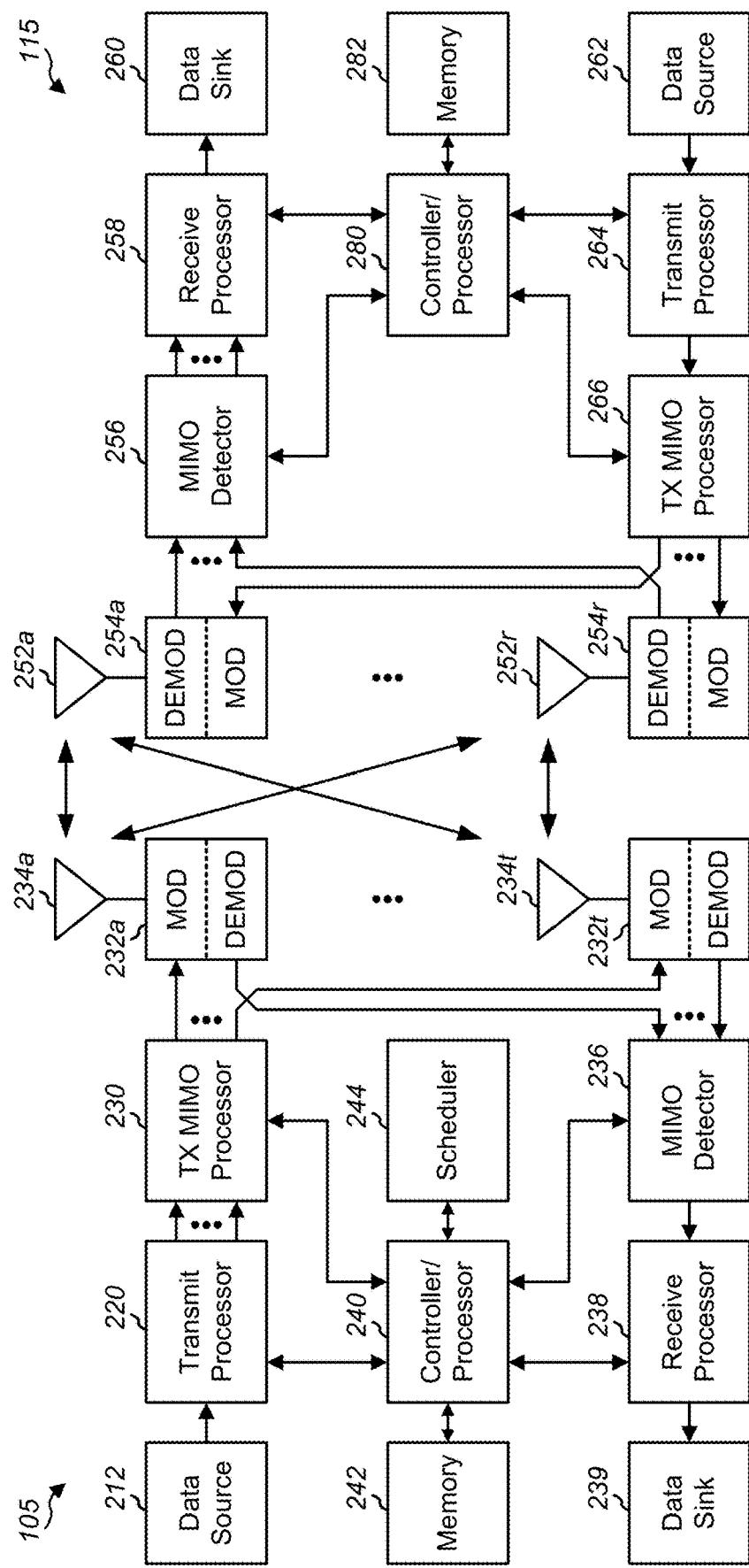
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. For example, the controller/processor 240 and/or other processors and modules at the base station 105 may perform or direct the execution of inter-slot bundling with frequency hopping. The controllers/processor 280 and/or other processors and modules at the UE 115 may also perform or direct the execution of various processes for the techniques described herein. For example, the controllers/processor 280 and/or other processors and modules at the UE 115 may also perform or direct the execution of inter-slot bundling with frequency hopping. To illustrate, the components of the base station 105 and/or the UE 115 may perform or direct the execution of the operations of FIG. 3B, 3C, 4, 5, 6A, 6B, 7A, or 7B. As another illustration, the components of the base station 105 and/or the UE 115 may perform or direct the execution of the functional blocks illustrated in FIGS. 8 and 9, and/or other processes for the techniques described herein. The memories 242 and 282 may store data and program codes for the base station 105 and the UE 115, respectively. A scheduler 244 may schedule UEs for data transmission on the downlink and/or uplink.

In advanced wireless networks, coverage and efficient bandwidth usage are important parameters. For example, in NR superlight achieving sufficient coverage with the inherent bandwidth limitations is expected to be a challenge. NR superlight is for ultra-reduced complexity devices, and is a device category which is lower than standard devices and reduced capability device (e.g., RedCap devices). Such superlight devices have bandwidth limitations as compared to regular and RedCap devices. For example, such superlight devices may only support bandwidths of less than 20 MHz and exemplary superlight devices may include smart devices, wearable devices, IoT devices, low-end cell phones, etc. Such bandwidth limitations make achieving the coverage goals of wireless communication standards a challenge with such devices.

The aspects described herein are directed to bundling (e.g., inter-slot bundling) with frequency hopping. Combining bundling (e.g., inter-slot bundling) with frequency hopping is one solution for overcoming bandwidth limitations or more efficiently utilizing bandwidth, such as overcoming the bandwidth limitations of reduced capacity devices. Such enhanced coverage may be used for uplink and/or sidelink channel transmissions. As illustrative, non-limiting examples, the enhanced coverage may be applied for PUSCH and/or PUCCH transmissions. Additionally, combining bundling (e.g., inter-slot bundling) with frequency hopping can also achieve a higher or desired level of frequency diversity.

Such combined techniques of inter-slot bundling and hopping may include intra-BWP frequency hopping, inter-BWP frequency hopping, and mixed BWP hopping. Intra-BWP frequency hopping may offer lower complexity and less (e.g., no) re-tuning time as compared to inter-BWP frequency hopping. However, inter-BWP frequency hopping may offer higher frequency diversity and gain. Mixed BWP hopping can offer both full frequency diversity gain and limit re-tuning times between some hops/bundles.

Figure 3A:
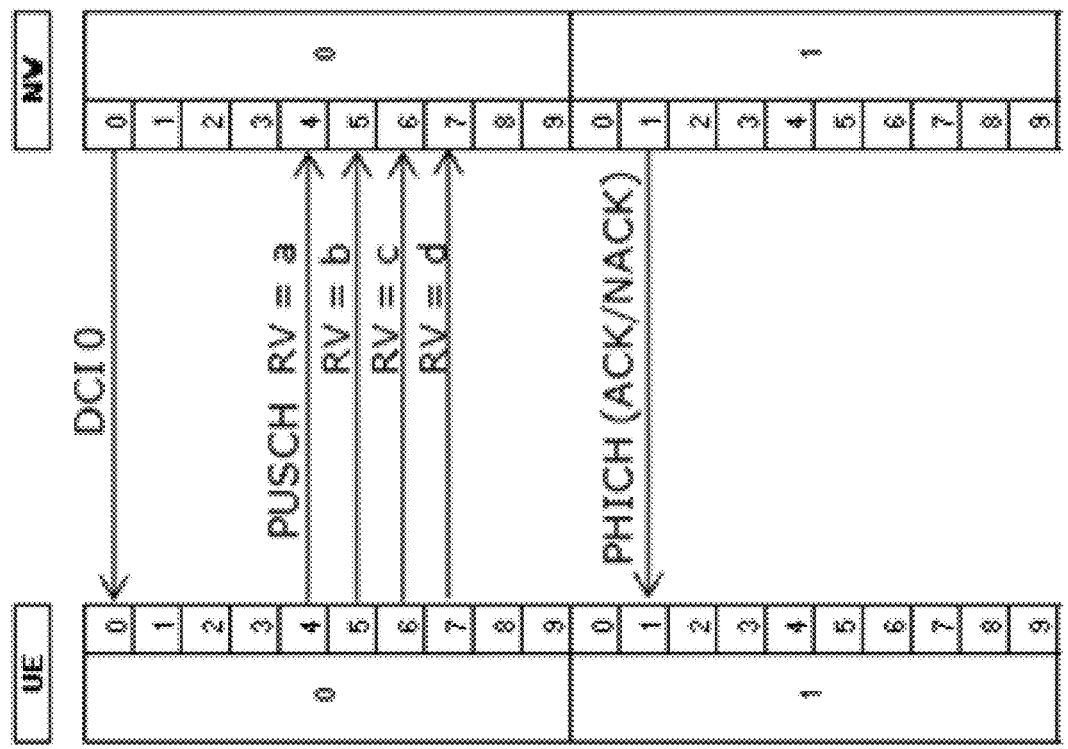
FIG. 3A is a diagram illustrating an example of transmission bundling.

FIG. 3A is an example of a diagram depicting transmission bundling. Transmission bundling is the transmission of the same data multiple times, such as in a row, to increase the possibility of data reception and/or decoding. A receiving device may have multiple opportunities to receive and decode the data of the transmissions and may optionally combine the signals or portions thereof to increase a strength of the signal, such as the energy and/or signal-to-noise (SNR) ratio. In FIG. 3A, a timing diagram 300 is illustrated between a UE and a network device (e.g., base station) and depicts transmission bundling operations.

During operation, the base station transmits a DCI (DCI 0) during a first sub-frame (sub-frame 0) of a first frame (frame 0). The UE receives the DCI and determines to perform transmission bundling, such as PUSCH bundling for TTI, based on the DCI. The determination to perform bundling and the configuration of such bundling may also be based on a prior RRC message (not shown in FIG. 3A). The UE transmits a PUSCH transmission in four consecutive sub-frames of the fifth through the ninth sub-frames (sub-frames 4-8). The PUSCH transmissions may be referred to as repetitions, and each transmission, the original and the three subsequent repetitions) all have the same data and a different redundancy value (RV) as illustrated. The base station has a higher likelihood of receiving the data and may then send an acknowledgement message, such as a HARQ feedback message (e.g., ACK/NACK), as illustrated in FIG. 3A.

Figure 3C:
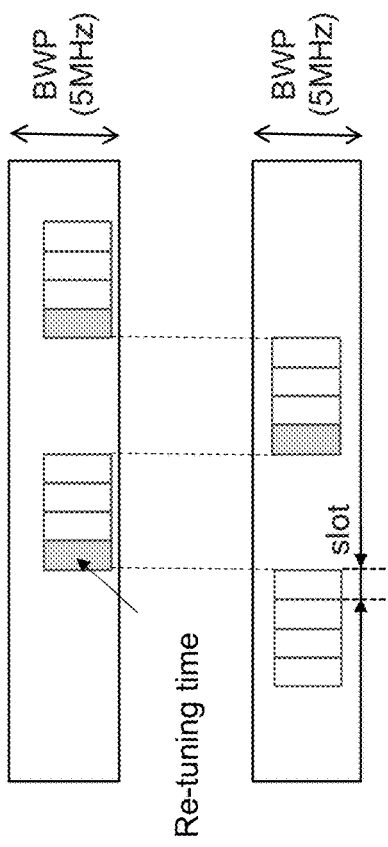
FIG. 3C is a diagram illustrating another example of inter-slot bundling.
Figure 3B:
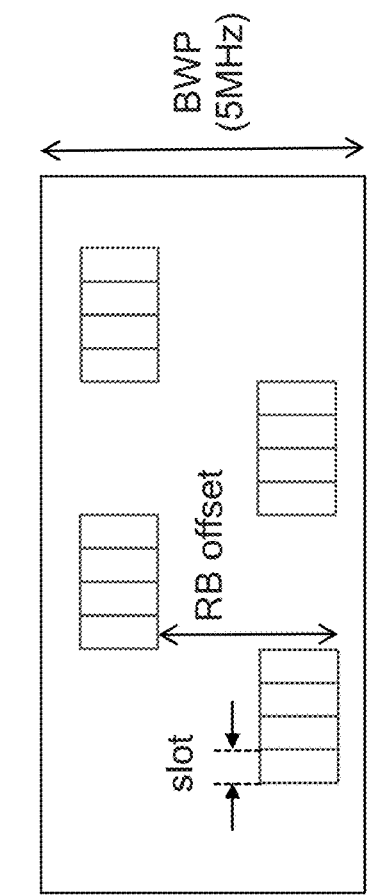
FIG. 3B is a diagram illustrating an example of inter-slot bundling.

FIG. 3B is an example of a diagram depicting inter-slot bundling. FIG. 3B illustrates inter-slot bundling with intra-BWP frequency hopping. Frequency hopping generally is when subsequent transmissions utilize different frequencies. Frequency hopping is another way of avoiding interference and increasing transmission reliability. Intra-BWP frequency hopping is when subsequent transmissions, here bundles of transmissions, occur and hop within the same BWP and thus within a same general range of frequencies. In FIG. 3B, an example of intra-BWP hopping is illustrated for 16 total repetitions and a bundle size of 4. That is, 16 transmissions are used to transmit the same data (e.g., uplink data) and the transmissions are grouped into bundles of 4 transmissions. Each bundle of transmissions is offset by a number of resource blocks (RBs) (RBoffset) from each other such that each bundle of transmissions occurs on a different frequency of the BWP than the previous bundle of transmissions. In the example of FIG. 3B, a first four transmissions of a first bundle are sent with a first frequency. Then the frequency "hops" to a second frequency for the next four transmissions of a second bundle. The frequency then "hops" back to the first frequency for the next four transmissions of a third bundle, and hops back to the second frequency for the last four transmissions of a fourth bundle. Each hop is in the same BWP.

FIG. 3C is another example of a diagram depicting inter-slot bundling. FIG. 3C illustrates inter-slot bundling with inter-BWP frequency hopping. Inter-BWP frequency hopping is when subsequent transmissions, here bundles of transmissions, occur in different BWPs and thus in different ranges of frequencies. In FIG. 3C, an example of inter-BWP hopping is illustrated for 16 total repetitions and a bundle size of 4. That is, 16 transmissions are used to transmit the same data (e.g., uplink data) and the transmissions are grouped into bundles of 4 transmissions. Each bundle of transmissions is in a different BWP from an adjacent bundle such that any bundle of transmissions occurs in a different BWP (and on a different frequency) than the previous bundle of transmissions. When changing BWPs, a device usually has to modify settings of its physical components, i.e., re-tune. To illustrate, the device (or a receiving device) may have to change settings of a filter. The time this takes is often referred to a re-tuning time and a delay is often implemented when a BWP is switched to account for this delay. This delay is usually a portion of a slot, such as one or more symbols of the slot.

Inter-slot bundling with frequency hopping, as in FIGS. 3B and 3C, may utilize additional configuration information, as compared to bundling only or frequency hopping only, to indicate settings for inter-slot bundling with frequency hopping. Such additional configured information may include bundle size information and additional or different RV information. Inter-slot bundling with frequency hopping may also utilize configuration information including periodicity, random access time (time RA), random access frequency (frequency RA), DMRS configuration, modulation coding scheme (MCS), transport block size (TBS), power control, number of repetitions (RepK), and RV cycling sequence (RV pattern or hopping pattern). Such inter-slot bundling with frequency hopping configuration may be done statically, semi-statically, or dynamically, below.

Furthermore, inter-BWP frequency hopping may utilize additional configuration information, as compared to intra-BWP frequency hopping, to indicate settings for inter-BWP frequency hopping. For example, BWP hopping pattern information and re-tuning information may also be communicated for inter-BWP frequency hopping. Such inter-BWP frequency hopping configuration may be done statically, semi-statically, or dynamically. Static configuration is when the configuration or configurations are set by a standard or network. Such configuration information may pre-programmed or transmitted on connection to the network.

Semi-static configuration may include configuration information which is transmitted periodically by a network to device, such as by RRC message. This configuration information then may apply until it is changed by the network. For example, a base station may indicate BWP hopping pattern by higher layer (e.g., RRC) message. To illustrate, an RRC message may indicate BWP 0123, BWP 0202, BWP 0000, or BWP 0321. Then the network may include a BWP hopping flag in a lower layer message, such as DCI, to indicate if BWP hopping is enabled. The BWP hopping flag may include a single-bit field and may indicate to use the BWP hopping pattern configured by the higher layer message.

Dynamic configuration may correspond to schemes where lower level, such as physical or layer 1, messages indicate a configuration for a particular transmission or group of transmissions. For example, pre-programmed or semi-statically configured BWP hopping patterns may be indicated by DCI message. In some such implementations, a base station indicates a list of BWP hopping patterns, an active BWP, or both by higher layer (e.g., RRC) message. To illustrate, an active BWP may indicate BWP 0, 1, 2, or 3 as the active UL BWP, and the list of patterns may include multiple patterns such as two or more of BWP 0123, BWP 0202, BWP 0000, and BWP 0321. Then the network may indicate a particular BWP hopping pattern (e.g., BWP 0321) of the BWP hopping patterns by lower layer message, such as DCI. The BWP hopping pattern index may include a multi-bit field, such as two or more bits. A same random access frequency may be applied inside each BWP.

Inter-slot bundling with frequency hopping may also be compatible with and utilize configured grants. In some implementations, the configuration information for inter-slot bundling with frequency hopping (e.g., inter-BWP frequency hopping) may be transmitted by configured grants, such as Type-1 or Type-2 configured grants. When using configured grants, the base station may assign a large number of repetitions, such as 1024. This represents a significant increase of the current amount of supported repetitions of 8. To reduce and/or prevent wasting of resources and bandwidth, a receiving and/or coordinating device, such as a base station, may stop transmission of the repetitions if the data is received. For example, a base station may use a DCI to stop or deactivate the configured grant before the end of the PUSCH repetitions, that is before the end of the last repetition of the PUSCH schedule in the configured grant. Along with bandwidth and resource saving, such deactivation of configured grants and early termination of repetitions can reduce interference and save UE power. Although the above example has been described for Type-2 configured grants, Type-1 configured grants may also be deactivated by DCI.

Although conventional bundling, as shown in FIG. 3A, uses a different RV for each transmission occasion (each slot), in the examples of FIGS. 3B and 3C, the RV values, such as a pattern thereof, can be configured. Additionally, consecutive transmission occasions (e.g., slots) may have the same RV value. For example, each bundle may have a same RV value, and the RV value may change from bundle to bundle rather than from transmission to transmission or occasion/slot to occasion/slot. For example, the RV value can change from 0 to 3 to 2 to 1 for each bundle. Conventionally, a RV pattern of 0231 is used for TTI bundling. However, other patterns, such as 0321, are better for different channels and/or transmissions. Thus, enhanced performance and more flexible performance can be achieved by using RV information to enable additional configurations of RVs/patterns. Additionally, by using RV slot bundling (where the RV value changes from bundle to bundle), symbol level combining may be used. For example, symbol level combining may be used between consecutive transmissions and/or between transmissions of the same bundle.

Figures 3D, 3E:
FIG. 3D is an example of a diagram depicting parameters for inter-slot bundling with frequency hopping.
FIG. 3E is a diagram illustrating an equation for inter-slot bundling with frequency hopping.

FIG. 3D is an example of a diagram depicting parameters for inter-slot bundling with frequency hopping. In FIG. 3D, a number of repetitions (RepK) parameter and a periodicity parameter are depicted. The number of repetitions (RepK) corresponds to the number of repetitions, such as the number of transmissions of the same TB within a bundle. For inter-slot bundling, the number of repetitions (RepK) may indicate a number of repetitions for each bundle. The periodicity is the period of each repeated channel and may be indicated in time, such as milliseconds (ms) or slots.

FIG. 3E is an example of a diagram depicting an equation for inter-slot bundling with frequency hopping. The equation of FIG. 3E is for determining a RB starting value for a nth transmission (nth repetition). RB start is a starting RB for the group of transmissions. RB offset is a change in RBs between bundles (such as a difference in frequencies). N size/Bundle is a size of the bundles of transmissions.

Figure 4:
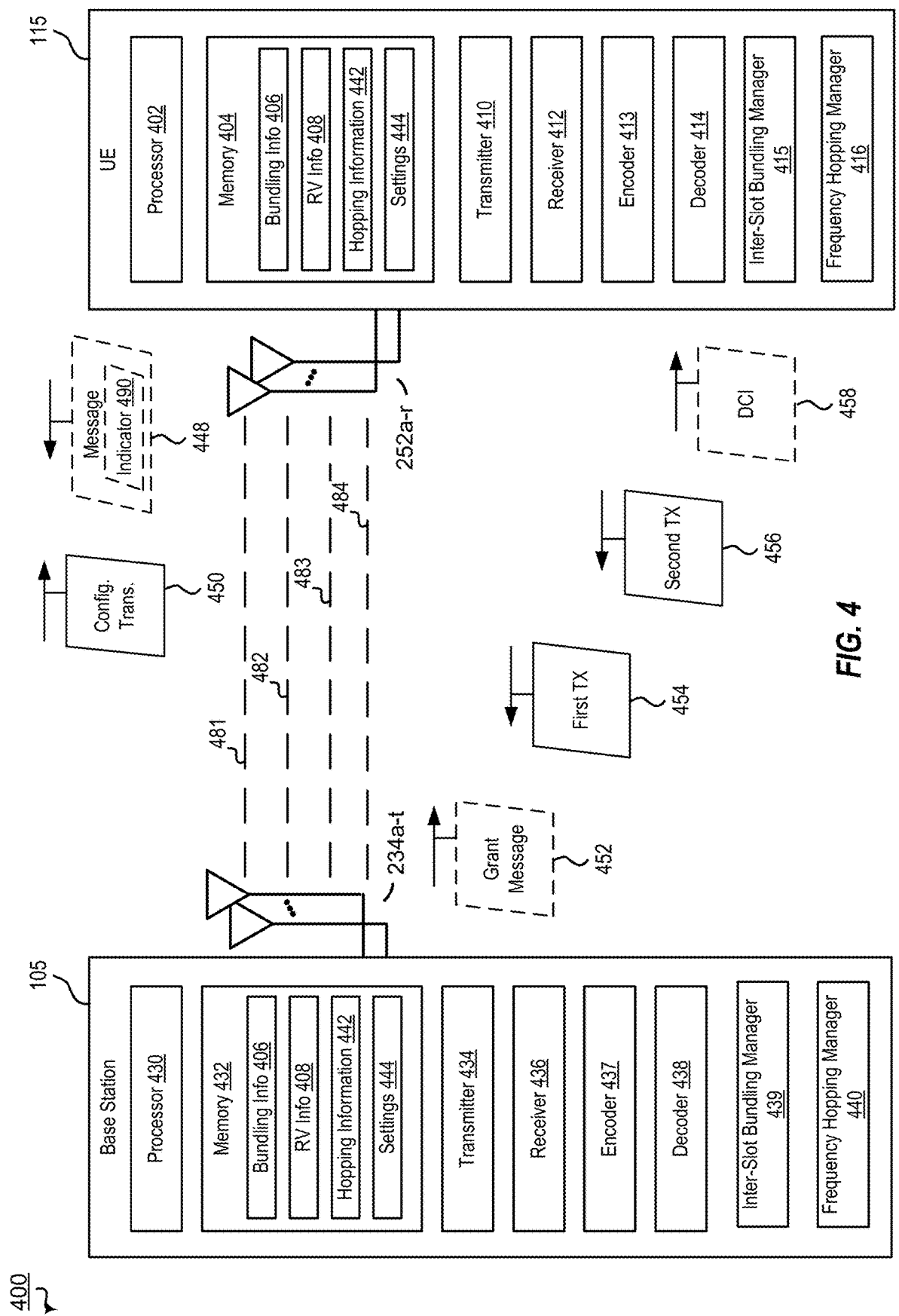
FIG. 4 is a block diagram illustrating an example wireless communication system that supports use of inter-slot bundling with frequency hopping operations according to one or more aspects.

FIG. 4 illustrates an example of a wireless communications system 400 that supports inter-slot bundling and frequency hopping operations in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105, a UE 115, and optionally a second UE. Use of inter-slot bundling and frequency hopping may increase coverage for low bandwidth devices. Increased coverage may reduce latency and increase reliability for low bandwidth and/or low complexity devices, such as reduced capacity and ultra-reduced capacity devices. Thus, network and device performance can be increased for lower complexity devices.

UE 115 and base station 105 may be configured to communicate via frequency bands, such as FR1 having a frequency of 410 to 7125 MHz, FR2 having a frequency of 24250 to 52600 MHz for mm-Wave, and/or one or more other frequency bands. It is noted that Subcarrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated using MAC CE transmissions, RRC transmissions, SCI (sidelink control information), transmissions, another transmission, or a combination thereof.

UE 115, and optionally second UE, can include a variety of components (e.g., structural, hardware components) used for carrying out one or more functions described herein. For example, these components can includes processor 402, memory 404, transmitter 410, receiver 412, encoder, 413, decoder 414, inter-slot bundling manager 415, frequency hopping manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store bundling information data 406, RV information data 408, hopping information data 442, settings data 444, or a combination thereof, as further described herein.

The bundling information data 406 includes or corresponds to data associated with or corresponding to bundling of transmissions and corresponding bundling operations. For example, the bundling information data 406 may indicate a type of channel transmissions for bundling, such as uplink or sidelink. To illustrate, the bundling information data 406 may indicate bundling for PUSCH transmissions, PUCCH transmissions, or both. The bundling information data 406 may further include data indicating bundling configurations, such as a number of repetitions (RepK), a bundle size, a periodicity, etc.

The RV information data 408 includes or corresponds to data associated with or corresponding to redundancy values (RV). For example, the RV information data 408 may indicate a pattern or sequence of RV values to use. To illustrate, the RV information data 408 may indicate a pattern of RVs to use for each bundle of transmissions. The RV for each transmission of the bundle may be the same and the RV may change for each bundle/hop. Additionally, or alternatively, the RV can change for each transmission of the bundle.

The hopping information data 442 includes or corresponds to data associated with or corresponding to frequency hopping operations. The hopping information data 442 enable frequency hopping combined with inter-slot bundling. The frequency hopping may be inter-BWP and/or intra-BWP. For example, the hopping information data 442 may indicate a type of frequency hopping (e.g., inter-BWP, intra-BWP, or mixed) and corresponding settings. To illustrate, when inter-BWP hopping is used, the hopping information 442 data may further indicate re-tuning information. The re-tuning information may indicate a method of calculating re-tuning time and/or a method for adjusting for re-tuning time. As examples of methods of calculating re-tuning time, the hopping information data 442 may indicate to use a set value, a look-up table, or a formula/equation to determine an amount of time (e.g., number of symbols) for re-tuning. The re-tuning time may be based on a type of transmissions (such as PUSCH or PUCCH), a format of the transmission (e.g., long or short), a SCS, or a combination thereof. As examples of methods of adjusting for re-tuning time, the hopping information data 442 may indicate to use puncturing, rate matching, or both. For example, the hopping information data 442 may indicate to puncture (remove) particular symbols when certain conditions are met, and to shift certain types of symbols (e.g., reference signals, such as DMRS symbols) when the certain conditions are not met or when other conditions are met.

The settings data 444 includes or corresponds to data associated with inter-slot bundling with frequency hopping operations. The settings data 444 may include settings and/or conditions data for determining when and/or how to implement inter-slot bundling with frequency hopping. The settings data 444 may include mode data, such as certain parameters or threshold to use based on an operating mode. For example, the mode data may include parameters or conditions for operating for particular channels, such as PUSCH only, PUCCH only, or PUSCH and PUCCH. Additionally, or alternatively, the settings data 444 may include one or more of random access setting information (e.g., such as time and/or frequency information), DMRS configuration information, MCS/TBS information, power control parameter information, CE information, configured grant information, or uplink channel format information.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Inter-slot bundling manager 415 may be configured to determine and perform inter-slot bundling operations. For example, inter-slot bundling manager 415 is configured to perform inter-slot bundling determination, bundling, and/or transmission operations. As an illustrative example of determination operations, the inter-slot bundling manager 415 may determine configurations for inter-slot bundling, such as repetition number, bundle size, periodicity, a timing (e.g., starting RB), etc. To illustrate, inter-slot bundling manager manger 415 may determine bundling configuration information from a received message. As an illustrative example of bundling operations, the inter-slot bundling manager 415 may instruct another component to generate bundled transmissions. As an illustrative example of transmission operations, the inter-slot bundling manager 415 may instruct another component to communicate the bundled transmissions.

Frequency hopping manager 416 may be configured to determine and perform frequency hopping operations. For example, frequency hopping manager 416 is configured to determine what frequency hopping operations to perform, such as inter-BWP or intra-BWP frequency hopping. As another example, the frequency hopping manager 416 is configured to determine the settings and/or configurations for frequency hopping. To illustrate, the frequency hopping manager 416 may determine re-tuning operations. In such implementations, the frequency hopping manager 416 may determine to perform puncturing or rate matching, and may optionally determine the details of such puncturing or rate matching and instruct another component (e.g., a filter) to re-tune.

Base station 105 includes processor 430, memory 432, transmitter 434, receiver 436, encoder 437, decoder 438, inter-slot bundling manager 439, frequency hopping manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to bundling information data 406, RV information data 408, hopping information data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. Inter-slot bundling manager 439 may include similar functionality as described with reference to inter-slot bundling manager 415. Frequency hopping manager 440 may include similar functionality as described with reference to frequency hopping manager 416.

During operation of wireless communications system 400, base station 105 may determine that UE 115 has inter-slot bundling and frequency hopping capability. For example, base station 105 may transmit a message 448 that includes an inter-slot bundling and frequency hopping operation indicator 490 (e.g., inter-slot bundling and frequency hopping for uplink channel operation). Indicator 490 may indicate inter-slot bundling and frequency hopping operations or a particular type or mode of inter-slot bundling and frequency hopping operations. In some implementations, a base station 105 sends control information to indicate to UE 115 that inter-slot bundling and frequency hopping operations and/or a particular type of inter-slot bundling and frequency hopping operations are to be performed. For example, in some implementations, message 448 (or another message, such as configuration transmission 450) is transmitted by the base station 105 or the network entity. The configuration transmission 450 may include or indicate to use inter-slot bundling and frequency hopping operations or to adjust or implement a setting of a particular type of inter-slot bundling and frequency hopping operations. For example, the configuration transmission 450 may include one or more of the bundling information data 406, the RV information data 408, the hopping information data 442, or the settings data 444.

During operation, devices of wireless communications system 400 perform inter-slot bundling and frequency hopping operations. For example, the wireless communication devices (e.g., a base station and UE) exchange transmissions via a downlink or uplink channel. Alternatively, wireless communication devices (e.g., two UEs) exchange transmissions via a sidelink channel. In the example of FIG. 4, the base station 105 optionally transmits an uplink grant message 452 to the UE 115. The uplink grant message 452 may include or indicate one or more uplink grant instances for the UE 115. The uplink grant message may include or correspond to PDCCH transmission, such as a DCI. In a particular implementation, the uplink grant message 452 is a configured grant.

In some implementations, the uplink grant message 452 may include or indicate data for inter-slot bundling and/or frequency hopping information, such as one or more the bundling information data 406, the RV information data 408, the hopping information data 442, or the settings data 444. Additionally, or alternatively, the uplink grant message 452 may activate inter-slot bundling and/or frequency hopping information.

The UE 115 may receive the uplink grant message 452 and may determine one or more uplink grant instances indicated by the base station 105. The UE 115 may optionally determine if it has data to send and if it will attempt to use the particular resource or resources reserved by the base station 105 for uplink transmission. The UE 115 may then attempt to transmit during the particular transmission resources for the uplink grant instances. For example, the UE 115 may transmit a first bundle of transmissions 454 via a first frequency and a second bundle of transmissions 456 via a second frequency. The transmissions of the first bundle of transmissions 454 and the second bundle of transmissions 456 may indicate the same data or payload. That is the transmissions may be repetitions of a PUSCH or PUCCH. The first bundle of transmissions 454 may have a first RV indicated by RV information and the second bundle of transmissions 456 have a second RV indicated by the RV information. The RV information may be included in the configuration transmission 450 or the uplink grant message 452.

The base station 105 may receive one or more of transmissions of the first bundle of transmissions 454, the second bundle of transmissions 456, or both. The base station 105 may combine signals of the one or more of received transmissions. For example, the base station 105 may combine signals or portions of signals to generate a combined signal. The signals may come from the first bundle of transmissions 454 only, the second bundle of transmissions 456 only, or both bundles (and optionally other bundles).

In some implementations, the base station 105 may send a DCI transmission to deactivate the assigned uplink grant instances and cease transmission of the repetitions. For example, the UE 115 may be assigned 1024 total repetitions, but the base station 105 may only need 8 repetitions (2 bundles of 4 transmissions) to successfully decode the transmission. The bundling and hopping may enable the UE 115 (e.g., a NR superlight device) to effectively communicate and increase its coverage while using or being capable of a limited bandwidth (e.g., 5 MHz).

Accordingly, the UE 115 and base station 105 may be able to more effectively communicate data and increase coverage. Thus, FIG. 4 describes enhanced inter-slot bundling and frequency hopping operations for wireless communication devices. Using enhanced inter-slot bundling and frequency hopping operations may enable improvements when devices are operating with limited bandwidth and/or in congested spectrum. Performing enhanced inter-slot bundling and frequency hopping operations enables increased gain, redundancy, and reliability and thus, enhanced UE and network performance reducing errors and latency.

Figure 5:
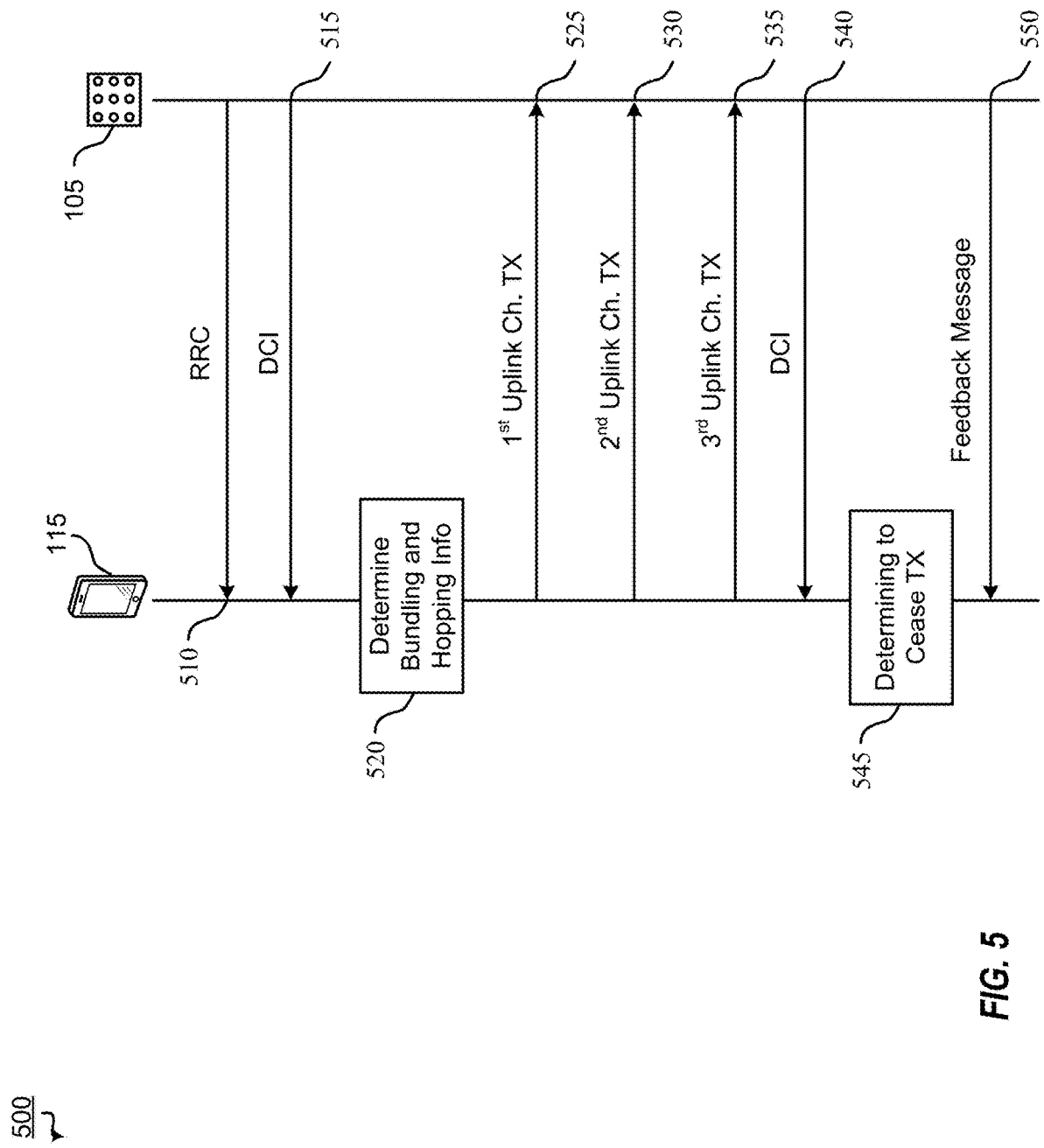
FIG. 5 is a ladder diagram illustrating an example wireless communication system that supports use of inter-slot bundling with frequency hopping operations according to one or more aspects.

FIG. 5 illustrates an example of a ladder diagram for inter-slot bundling and frequency hopping operations according to some aspects. Referring to FIG. 5, FIG. 5 is a ladder diagram 500 of inter-slot bundling and frequency hopping operations. In the example of FIG. 5, the ladder diagram illustrates a UE 115 and a network entity, such as base station 105. The diagram is simplified for illustration and explanation. In practice, many UEs may be connected to the network entity, and optionally, some UEs may be connected to multiple network entities and/or other UEs.

At 510, the base station 105 transmits a higher layer message (e.g., layer 3) indicating configuration information for inter-slot bundling and frequency hopping operations. For example, the base station 105 transmits a RRC message indicating configuration information for inter-slot bundling and frequency hopping operations.

At 515, the base station 105 optionally transmits a lower layer message (e.g., layer 1) activating inter-slot bundling and frequency hopping operations. For example, the base station 105 transmits a DCI message indicating a plurality of transmission resources and activating inter-slot bundling and frequency hopping operations. Additionally, in some implementations, the DCI message further includes configuration information for inter-slot bundling and frequency hopping operations. For example, the DCI may indicate a number of repetitions, a bundle size, and RV pattern or sequence. In semi-static configurations, the DCI may include a flag or 1 bit field to indicate bundling and/or hopping are active and to use the settings of the higher layer message (RRC message). In dynamic configurations, the DCI may include a field (e.g., 2 or more bits) to indicate a particular RV pattern of multiple patterns configured by RRC or pre-configured.

In some implementations, the bundle transmissions are enabled by configured grants, such as Type-1 or Type-2. Type-1 is based on RRC configuration only and all such configured grant settings are transmitted via RRC. For example, each of the periodicity, the random access time (time RA), the random access frequency (frequency RA), the DMRS configuration, the MCS/TBS, the power control parameter, the number of repetitions (RepK), and the RV cycling sequence (RV pattern or hopping pattern) may be indicated by RRC.

Type-2 is based on a RRC configuration and layer 1 messages. For example, an RRC message may indicate or update a plurality of parameters and a physical channel message, such as DCI, may indicate a second plurality of parameters and be used to active and/or deactivate the configured grant. For example, each of the random access time (time RA), the random access frequency (frequency RA), the DMRS configuration, and the MCS/TBS may be indicated by DCI and the other may be indicated by RRC.

At 520, the UE 115 determines bundling and hopping information. For example, the UE 115 determines bundling and hopping information from the RRC message, the DCI message, or both.

At 525, the UE 115 transmits a first transmission of a first bundle of transmissions via a first frequency. For example, the UE 115 transmits a PUSCH or PUCCH transmission during a first slot at a first frequency and a first BWP index. The first transmission has a first RV value.

At 530, the UE 115 transmits a second transmission of the first bundle of transmissions via the first frequency. For example, the UE 115 transmits a repetition of the PUSCH or the PUCCH transmission during a second slot at the first frequency and the first BWP index. The second transmission has the first RV value.

At 535, the UE 115 transmits a third transmission of a second bundle of transmissions via a second frequency. For example, the UE 115 transmits another repetition (e.g., second) of the PUSCH or the PUCCH transmission during a third slot at the second frequency and the second BWP index. The second transmission has a second RV value different from the first.

At 540, the base station 105 optionally transmits a DCI. To illustrate, the base station may determine that is has successfully received the PUSCH or the PUCCH transmission and the base station 105 transmits the DCI to cease transmission of future repetitions of the PUSCH or the PUCCH transmission.

At 545, the UE 115 determines to cease transmission of future repetitions of the PUSCH or the PUCCH transmission based on the DCI. For example, the UE 115 may determine that the DCI has re-assigned the granted transmission resources or has deactivated the inter-slot bundling and frequency hopping for the particular PUSCH or the PUCCH transmission.

In a particular implementation, the base station 105 may transmit the DCI to stop or deactivate the configured grant before the end of the repetitions, that is before the end of the last repetition of the PUSCH scheduled in the configured grant. Along with bandwidth and resource saving, such deactivation of configured grants and early termination of repetitions can reduce interference and save UE power. Although the above example has been described for Type-2 configured grants, Type-1 configured grants may also be deactivated by RRC or a specific deactivation message (e.g., DCI).

At 550, the base station 105 optionally transmits a feedback message. To illustrate, the base station 105 may determine that it has successfully received the PUSCH or the PUCCH transmission and the base station 105 transmits a feedback message, such as a HARQ feedback message (e.g., ACK/NACK) indicating reception or no-reception. The UE 115 may continue transmission of repetitions in response to a negative acknowledgement and may cease transmission of repetitions in response to a positive acknowledgement.

Thus, in the example in FIG. 5, the UE and base station perform inter-slot bundling and frequency hopping operations. That is, the UE transmits repetitions of uplink channel transmissions in bundles with frequency hopping between the bundles. The frequency hopping may be inter-BWP or intra-BWP and may operate in accordance with the examples provided below in FIGS. 6A-7B.

Figure 6A:
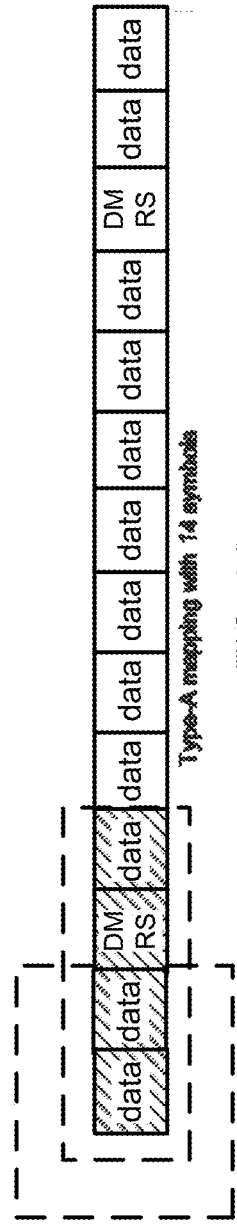
FIGS. 6A and 6B are diagrams illustrating re-tuning examples for uplink channel transmissions according to one or more aspects.
Figure 6B:
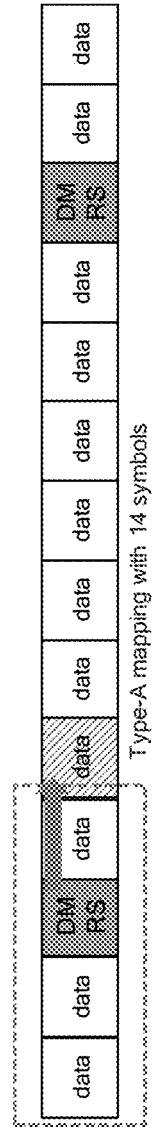

FIGS. 6A and 6B illustrate re-tuning examples for uplink channel transmissions. In FIGS. 6A and 6B, re-tuning examples for PUSCH transmissions are illustrated. Referring to diagram 600 of FIG. 6A, diagram 600 illustrates a PUSCH with a format of Type-A. That is the PUSCH has 2 DMRS symbols positioned at symbols 3 and 12. The re-tuning time may be determined based on SCS. As illustrative, non-limiting examples, the re-tuning time may be 2 OFDM symbols for a first SCS of 15 KHz and 4 OFDM symbols for a second SCS of 30 KHz. Diagram 600 has two dashed boxes indicating the symbols (in cross-hatching) to remove or "puncture" when a SCS of 15 KHz is used and when a SCS of 30 KHz is used.

Referring to diagram 650 of FIG. 6B, diagram 650 also illustrates a PUSCH with a format of Type-A. Diagram 650 has a single dashed box indicating the re-tuning time (4 symbols) when a SCS of 30 KHz is used. In this example, the re-tuning time overlaps with/collides with a DMRS symbol, that is a first DMRS symbols at symbol 3. As the re-tuning time overlaps a DMRS symbol (or symbols), the DMRS symbol or symbols are shifted to the first available symbol or symbols. As illustrated, in diagram 650, the first DMRS symbol, symbol 3, is moved/shifted to symbol 5, the cross-hatched data symbol, to rate match. If the re-tuning time is less than 3 symbols in this example or does not overlap a DMRS symbol, then no rate matching or DMRS shifting is performed.

The rate matching may be performed by SLIV adjustment where R is a number of symbols for re-tuning (e.g., 2/4 symbols for 15/30 KHz SCS), S is a starting symbol, and L is a Number of symbols of the uplink channel. If S<R, then S is updated to R, and L is updated to L−(R−S) for the first slot of the upcoming hops. If S>R, no rate matching may be performed, that is no overlap may occur. Thus, as the re-tuning time does not overlap a DMRS symbol, DMRS shifting is not performed.

As compared to rate matching, symbol puncturing is simpler and supports symbol level combining. That is a portion of the signal for each symbol of a first transmission may be combined with its corresponding portion of the signal in another transmission. However, coding performance can be reduced, such as a number of reference signals may be reduced. With rate matching, coding performance is conserved or not reduced, but it is not compatible with symbol level combining.

Figure 7A:
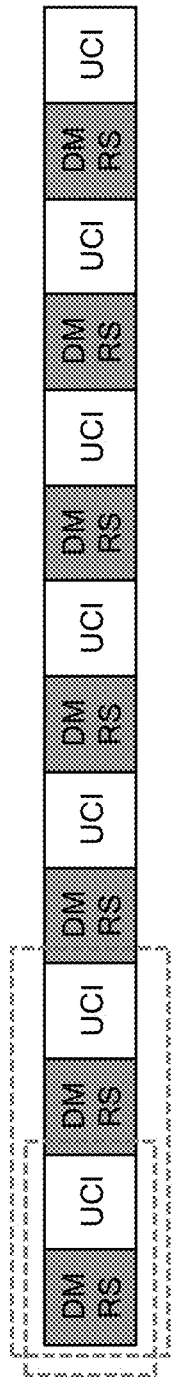
FIGS. 7A and 7B are diagrams illustrating additional re-tuning examples for uplink channel transmissions according to one or more aspects.
Figure 7B:
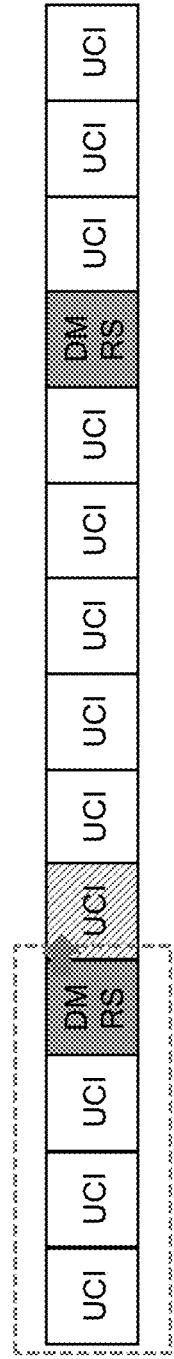

In some implementations, both puncturing and rate matching may be used. For example, puncturing and/or rate matching may be implemented based on one or more conditions. As an illustrative, non-limiting example, if the re-tuning time is 2 symbols or if 15 KHz SCS is used, rate matching is applied for PUSCH mapping type B. Additionally, or alternatively, if the re-tuning time is 4 symbols or if 30 KHz SCS is used, rate matching is applied for PUSCH mapping type A/B FIGS. 7A and 7B illustrate additional re-tuning examples for uplink channel transmissions. In FIGS. 7A and 7B, re-tuning examples for PUCCH transmissions are illustrated. Specifically, diagram 700 of FIG. 7A illustrates re-tuning for PUCCH format 1 and symbol puncturing, and diagram 750 of FIG. 7B illustrates re-tuning for PUCCH formats 3 and 4 and rate matching.

PUCCH transmission also have multiple formats. In Release 16, the formats include PUCCH format 0-4, with formats 0 and 2 referred to as short formats (e.g., 1-2 symbols), and 1, 3, and 4 referred to as long formats (e.g., 4-14 symbols).

In some implementations, only short PUCCH formats may be available to and/or utilized by a NR superlight UE with a PRACH CE (coverage extension) level of 0, such as a high SNR UE. The PRACH CE may be based on SSB RSRP, which determines the PRACH repetition number. The CE levels may be configured by SIB messages.

For PRACH CE level 1 and above, such as a low SNR UE, only long PUCCH formats may be available to and/or utilized by a NR superlight UE. A repetition number for PUCCH, such as indicated by the parameter nrofslots in a RRC message, may be up to 32 repetitions instead of the current 8.

Similar to PUSCH, the PUCCH configurations may be statically configured, semi-statically configured, or dynamically configured. As an example, the PUCCH repetition number is semi-statically configured by RRC when connected.

Additionally, or alternatively, a dynamic indication or derivation of the repetition number may be needed in some implementations. For example, dynamic indication of PUCCH repetitions may occur for HARQ-ACK message 4 (Msg-4) and before a dedicated PUCCH resource is configured for the UE. Such indication may be explicitly for the PUCCH and may be included in a DCI, such as DCI1-0. As another example, the indication may come from a repetition number for PDSCH, PDCCH, or both. This implicit mapping may be 1 to 1, based on a table (e.g., look-up table), or based on a formula/equation. As yet another example, the PUCCH repetition number may be based on CE level and/or configured by an information message (e.g., SIB). Alternatively, the PUCCH repetition number may be included as another entry in a cell-specific PUCCH configured table.

PUCCH operations may also support inter-BWP hopping. For example, when large format PUCCH transmissions are used, such as formats 3 and 4, slot bundling may be used for enabling DMRS bundling. To illustrate, frequency hopping may be performed or used based on whether slot bundling is enabled. In a particular example, slot bundling configuration or activation may also enable or at least partially configure frequency hopping.

Additionally, or alternatively, extra DMRS symbols may not be utilized when slot bundling is configured. Such extra or additional DMRS symbols may not be necessary when bundling is used. That is redundant DMRS symbols may not be used because such are not needed to achieve significant gain for decoding. Such reduction in DMRS symbols can increase coding gain for control data (UCI symbols). Illustrative examples of the number of DMRS symbols to use and their positions are illustrated in FIGS. 7A and 7B. The number and position of DMRS symbols to use is based on PUCCH length and whether additional DMRS symbols should be used. The number and position of DMRS symbols to use may also be based on hopping of for some PUCCH lengths (such as four). The determination of whether additional DMRS symbols should be used may be based on whether slot bundling is configured, which itself may be based on whether hopping is enabled.

Referring to diagram 700, diagram 700 illustrates a PUCCH with a format of 1. That is the PUCCH has 7 DMRS symbols or alternates between DMRS and data/control (UCI) symbols. The re-tuning time may be determined based on SCS similar to PUSCH with 2 OFDM symbols of re-tuning time for a SCS of 15 KHz and 4 OFDM symbols of re-tuning time for a SCS of 30 KHz. Diagram 700 has two dashed boxes indicating the symbols to remove or "puncture" when a SCS of 15 KHz is used and when a SCS of 30 KHz is used.

Referring to diagram 750, diagram 750 illustrates a PUCCH with a format of 3/4. That is the PUCCH has 2 DMRS symbols positioned at symbols 4 and 11. The re-tuning time may be determined based on SCS as described above. Diagram 750 has a single dashed box indicating the re-tuning time (4 symbols) when a SCS of 30 KHz is used. In this example, the re-tuning time overlaps with/collides with a DMRS symbol (symbol 4). As the re-tuning time overlaps the DMRS symbol (or symbols), the DMRS symbol (or symbols) are shifted to the first available symbol or symbols. As illustrated, in diagram 750, the first DMRS symbol, symbol 4, is moved/shifted to symbol 5, the cross-hatched UCI symbol, to rate match. If the re-tuning time is less than 4 symbols in this example or does not overlap a DMRS symbol, then no rate matching or shifting is performed.

Additionally, or alternatively, one or more operations of FIGS. 3B, 3C, and 4-7B may be added, removed, substituted in other implementations. For example, in some implementations, the example steps of FIGS. 3B and 3C may be used together. To illustrate, a device may switch between the operations of FIGS. 3B and 3C responsive to an indication from a host device or responsive to a determination (e.g., a determination regarding channel performance). As another example, some of the operations of FIGS. 4 and 5 may be used with the steps of any of FIGS. 6A-7B.

Figure 10:
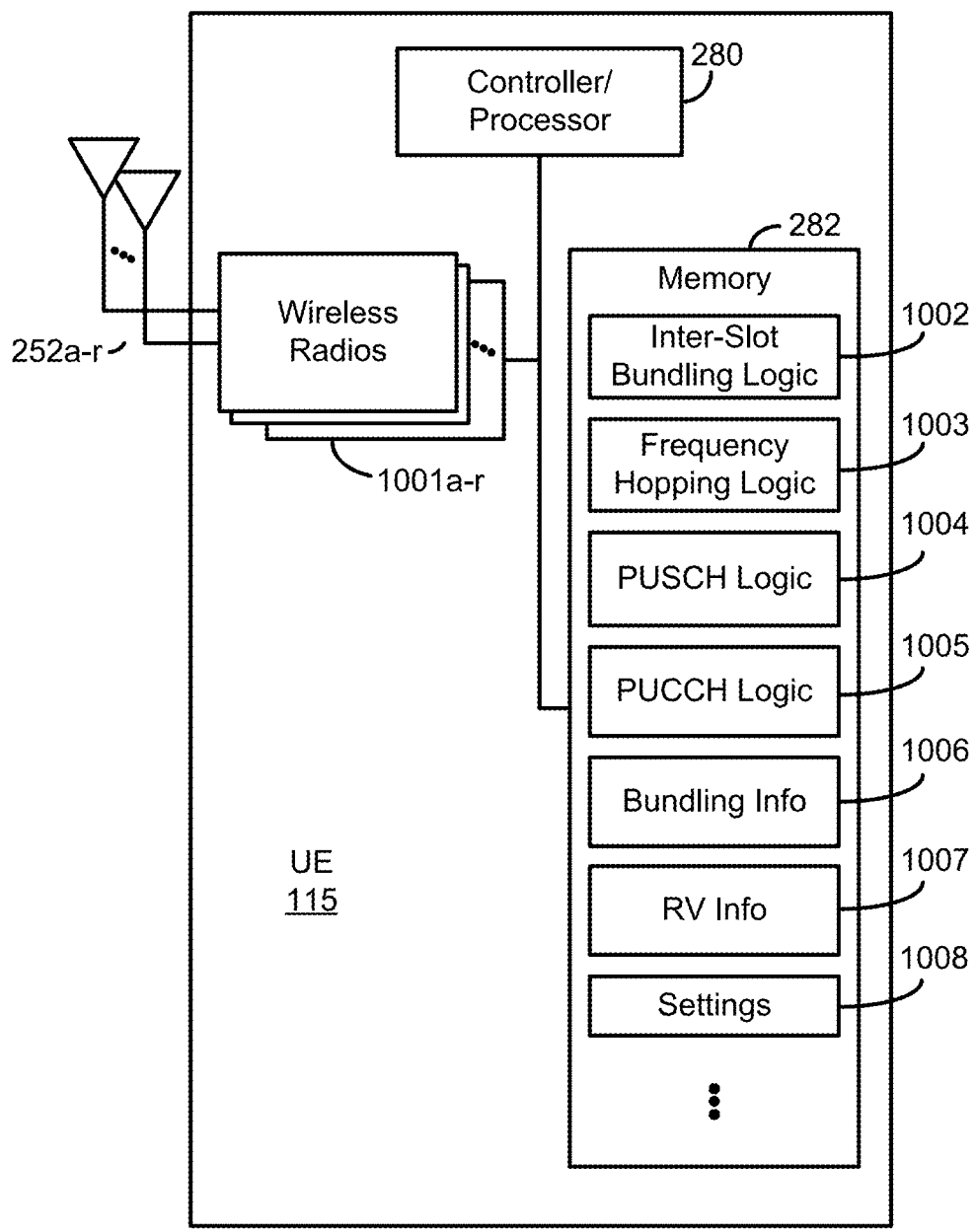
FIG. 10 is a block diagram of an example UE that supports use of inter-slot bundling with frequency hopping operations according to one or more aspects.

FIG. 8 is a flow diagram illustrating example blocks executed by a wireless communication device (e.g., a UE or base station) configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 10, memory 282 stores inter-slot bundling logic 1002, frequency hopping logic 1003, PUSCH logic 1004, PUCCH logic 1005, bundling information data 1006, RV information data 1007, and settings data 1008.

At block 800, a wireless communication device, such as a UE, receives a message indicating inter-slot bundling for uplink channel inter-BWP frequency hopping repetitions. For example, the UE 115 receives a RRC message indicating PUSCH and/or PUCCH inter-BWP frequency hopping with inter-slot bundling, as described with reference to FIGS. 4-7B.

At block 801, the UE 115 receives bundling information and redundancy value information for an uplink channel transmission and corresponding uplink channel transmission repetitions. For example, the UE 115 receives a message or messages indicating bundling information, such as bundling size, and an indication of an RV pattern, as described with reference to FIGS. 4-7B. To illustrate, the bundling information, the redundancy value, or both, may be included in the message indicating inter-slot bundling with inter-BWP hopping, that is the RRC message. Alternatively, the bundling information, the redundancy value, or both, may be included in a separate message or messages, such as a DCI and/or configured grant.

At block 802, the UE 115 transmits the uplink channel transmission with inter-slot bundling and frequency hopping and based on the bundling information and the RV information. For example, the UE 115 may generate and transmit a PUSCH or PUCCH transmission, as described with reference to FIGS. 4-7B. The uplink channel transmission is part of a first bundle of transmissions (first bundled transmission). To illustrate, the UE 115 may generate and transmit multiple PUSCH or PUCCH transmissions in sequential slots as a bundle, as described with reference to FIGS. 4-7B. In some implementations, the bundle has a first RV for each transmission and each transmission occurs in a corresponding spot and via a same BWP and frequency.

At block 803, the UE 115 transmits an uplink channel transmission repetition of the uplink channel transmission with inter-slot bundling and frequency hopping and based on the bundling information and the RV information. For example, the UE 115 may generate and transmit multiple PUSCH or PUCCH transmissions in sequential slots as a second bundle, as described with reference to FIGS. 4-7B. In some implementations, the second bundle has a second RV for each transmission and each second transmission occurs in a corresponding spot and via a same BWP and frequency. The second bundle has a different frequency than the first bundle and is in a different BWP than the first bundle. The UE 115 may determine a re-tuning time and account for such re-tuning time as described in FIGS. 6A-7B.

In some implementations, the uplink channel repetition is part of the same bundle as the uplink channel transmission. In other implementations, the uplink channel repetition is part of a different bundle and one or more other repetition transmissions occur between 802 and 803. For example, the UE 115 may generate and transmit a second bundled transmission based on the bundling information and the RV information. To illustrate, the UE 115 may generate and transmit multiple PUSCH or PUCCH transmissions in sequential slots as a second bundle, as described with reference to FIGS. 4-7B. In some implementations, the second bundle has a second RV for each transmission and each second transmission occurs in a corresponding spot and via a same BWP and frequency. The second bundle has a different frequency than the first bundle and is in a different BWP than the first bundle. The UE 115 may determine a re-tuning time and account for such re-tuning time as described in FIGS. 6A-7B.

The wireless communication device (e.g., UE or base station) may execute additional blocks (or the wireless communication device may be configured further perform additional operations) in other implementations. For example, the wireless communication device (e.g., the UE 115) may perform one or more operations described above. As another example, the wireless communication device (e.g., the UE 115) may perform one or more aspects as presented below.

In a first aspect, the uplink channel transmission and the uplink channel transmission repetition are included in a bundled transmission, the bundled transmission comprises multiple repetitions of uplink channel data of the uplink channel transmission, wherein the bundled transmission comprises two or more slots, wherein each repetition of the multiple repetitions comprises a single slot, and wherein the multiple repetitions are separated from an adjacent group of multiple repetitions by a frequency offset.

In a second aspect, alone or in combination with the first aspect, the uplink channel transmission is included in a first bundled transmission, wherein the uplink channel transmission repetition is included in a second bundled transmission, wherein the second bundled transmission comprises a second set of multiple repetitions of uplink channel data of the uplink channel transmission over two or more second slots, and wherein the uplink channel transmission repetition has a different frequency than the uplink channel transmission.

In a third aspect, alone or in combination with one or more of the above aspects, the uplink channel transmission comprises a PUSCH transmission.

In a fourth aspect, alone or in combination with one or more of the above aspects, the uplink channel transmission comprises a PUCCH transmission.

In a fifth aspect, alone or in combination with one or more of the above aspects, the bundling information indicates a RB offset, a bundling size, a BWP index, a number of repetitions, or a combination thereof.

In a sixth aspect, alone or in combination with one or more of the above aspects, the UE 115 further determines a starting RB for each bundle based on bundle size information and an index of repetitions.

In a seventh aspect, alone or in combination with one or more of the above aspects, the UE 115 further determines a BWP hopping pattern for the uplink channel transmission and repetitions based on configuration information included in the message.

In an eighth aspect, alone or in combination with one or more of the above aspects, the bundling information is included in a second message, and further comprising determining a BWP hopping pattern for the uplink channel transmission and repetitions based on the bundling information.

In a ninth aspect, alone or in combination with one or more of the above aspects, the message is a RRC message, and wherein the RRC message indicates a BWP hopping pattern.

In a tenth aspect, alone or in combination with one or more of the above aspects, the UE 115 further receives a DCI indicating a hopping flag (e.g., 1 bit) which indicates to use the BWP hopping pattern of RRC message In an eleventh aspect, alone or in combination with one or more of the above aspects, the message is a RRC message, and wherein the RRC message indicates a list of BWP hopping patterns and, the UE 115 further receives a DCI including a BWP pattern index (e.g., 2 bits) which indicates a particular BWP hopping pattern of the list BWP hopping patterns.

In a twelfth aspect, alone or in combination with one or more of the above aspects, the RRC message further indicates an active BWP.

In a thirteenth aspect, alone or in combination with one or more of the above aspects, each repetition of the first bundled transmission has the same RV.

In a fourteenth aspect, alone or in combination with one or more of the above aspects, the UE 115 further: generates a re-tuning time for uplink channel transmission repetitions; generates an uplink channel transmission repetition by using symbol puncturing to allow for the re-tuning time; re-tunes a filter to switch BWPs; and transmits the uplink channel transmission repetition via a BWP different from a BWP of the uplink channel transmission.

In a fifteenth aspect, alone or in combination with one or more of the above aspects, generating the uplink channel transmission repetition by using symbol puncturing includes removing symbols which occur during the re-tuning time.

In a sixteenth aspect, alone or in combination with one or more of the above aspects, the UE 115 further: generates a re-tuning time for uplink channel transmission repetitions; generates an uplink channel transmission repetition by using rate matching to allow for the re-tuning time; re-tunes a filter to switch BWPs; and transmits the uplink channel transmission repetition via a BWP different from a BWP of the uplink channel transmission.

In a seventeenth aspect, alone or in combination with one or more of the above aspects, the rate matching is performed (using SLIV adjustment) based on a number of symbols for re-tuning, a starting symbol and a number of symbols.

In an eighteenth aspect, alone or in combination with one or more of the above aspects, the re-tuning time is determined as a number of symbols for re-tuning, and wherein the number of symbols for re-tuning is determined based on subcarrier spacing (SCS).

In a nineteenth aspect, alone or in combination with one or more of the above aspects, if the starting symbol is less than the number of symbols for re-tuning, then: the starting symbol is updated to the number of symbols for re-tuning, and the number of symbols is updated to a difference of the number of symbols minus a difference of the number of symbols for re-tuning minus the starting symbol of the upcoming repetition.

In a twentieth aspect, alone or in combination with one or more of the above aspects, rate matching includes shifting a DMRS symbol of the uplink channel transmission repetition to a first available symbol when the DMRS symbol overlaps with symbols occurring during the re-tuning time.

In a twenty-first aspect, alone or in combination with one or more of the above aspects, the message is a configured grant, and wherein the uplink channel transmission and repetitions are indicated by the configured grant.

In a twenty-second aspect, alone or in combination with one or more of the above aspects, the configured grant is a type 1 configured grant and is based on RRC configuration.

In a twenty-third aspect, alone or in combination with one or more of the above aspects, the configured grant is a type 2 configured grant which is configured by RRC message and which is activated, deactivated, or both, by physical channel communications.

In a twenty-fourth aspect, alone or in combination with one or more of the above aspects, the UE 115 further receives a downlink transmission (e.g., DCI) indicating to cease transmission of the uplink channel repetitions prior to transmission of the number of indicated repetitions; and ceases transmission of the uplink channel repetitions.

In a twenty-fifth aspect, alone or in combination with one or more of the above aspects, a transmit power is constant over each inter-slot bundle of the uplink channel transmission and repetitions.

In a twenty-sixth aspect, alone or in combination with one or more of the above aspects, the frequency hopping comprises intra-BWP hopping and subsequent uplink channel transmissions (or transmit occasions) are in the same BWP as the uplink channel transmission.

In a twenty-seventh aspect, alone or in combination with one or more of the above aspects, the frequency hopping comprises mixed (inter and intra) BWP hopping and subsequent uplink channel transmissions are in the same BWP as the uplink channel transmission.

In a twenty-eighth aspect, alone or in combination with one or more of the above aspects, the same RV is applied for several consecutive transmission occasions.

In a twenty-ninth aspect, alone or in combination with one or more of the above aspects, an inter-slot bundle size is the same as a RV bundle size. To illustrate, the RV change may be aligned with the inter-slot frequency hopping.

In a thirtieth aspect, alone or in combination with one or more of the above aspects, the UE 115 further: determines a starting RB for a particular repetition of the uplink channel transmission based on a number of bundles and a size of the bundles; and transmits the particular repetition of the uplink channel transmission based on the starting RB.

In another aspect, a method of wireless communication includes receiving, by a wireless communication device, a message indicating inter-slot bundling for uplink channel inter-BWP frequency hopping repetitions; receiving, by the wireless communication device, bundling information and redundancy value information for an uplink channel transmission and corresponding uplink channel transmission repetitions; transmitting, by the wireless communication device, a first bundled transmission based on the bundling information and the RV information; and transmitting, by the wireless communication device, a second bundled transmission based on the bundling information and the RV information.

In an additional aspect, the first bundled transmission comprises multiple repetitions of uplink channel data, wherein the first bundled transmission comprises two or more slots, wherein each repetition of the multiple repetitions comprises a single slot, and wherein the multiple repetitions are separated from an adjacent group of multiple repetitions by a frequency offset.

In yet an additional aspect, the second bundled transmission comprises a second set of multiple repetitions of the uplink channel data over two or more second slots, and wherein the uplink channel transmission repetition has a different frequency than the uplink channel transmission.

Accordingly, wireless communication devices may perform inter-slot bundling and frequency hopping operations. By performing inter-slot bundling and frequency hopping operations coverage and reliability may be increased.

Figure 11:
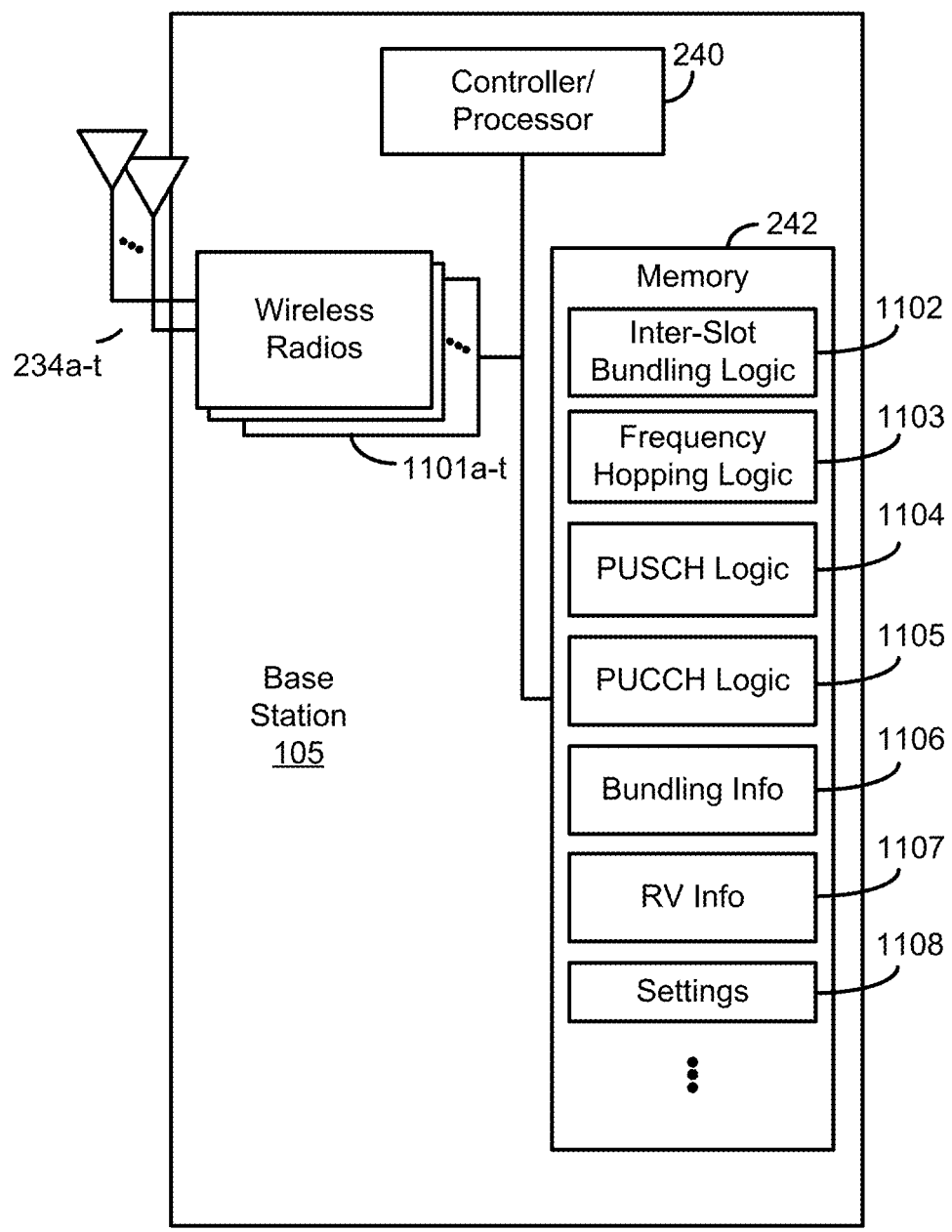
FIG. 11 is a block diagram of an example base station that supports use of inter-slot bundling with frequency hopping operations according to one or more aspects.

FIG. 9 is a flow diagram illustrating example blocks executed wireless communication device (e.g., a UE or base station) configured according to an aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIGS. 2 and/or 4.

For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1101a-t and antennas 234a-t. Wireless radios 1101a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 11, memory 282 stores beam inter-slot bundling logic 1102, frequency hopping logic 1103, PUSCH logic 1104, PUCCH logic 1105, bundling information data 1106, RV information data 1107, and settings data 1108.

At block 900, a wireless communication device, such as a base station, transmits a message indicating inter-slot bundling for uplink channel inter-BWP frequency hopping repetitions. For example, the base station 105 transmits a RRC message indicating PUSCH and/or PUCCH inter-BWP frequency hopping with inter-slot bundling, as described with reference to FIGS. 4-7B.

At block 901, the base station 105 transmits bundling information and redundancy value information for an uplink channel transmission and corresponding uplink channel transmission repetitions. For example, the base station 105 transmits a message or messages indicating bundling information, such as bundling size, and an indication of an RV pattern, as described with reference to FIGS. 4-7B. To illustrate, the bundling information, the redundancy value, or both, may be included in the message indicating inter-slot bundling with inter-BWP hopping, that is the RRC message. Alternatively, the bundling information, the redundancy value, or both, may be included in a separate message or messages, such as a DCI and/or configured grant.

At block 902, the base station 105 receives the uplink channel transmission with inter-slot bundling and frequency hopping and based on the bundling information and the RV information. For example, the base station 105 may receive a PUSCH or PUCCH transmission of multiple PUSCH or PUCCH transmissions in sequential slots as a bundle, as described with reference to FIGS. 4-7B. In some implementations, the bundle has a first RV for each transmission and each transmission occurs in a corresponding spot and via a same BWP and frequency.

At block 903, the base station 105 receives an uplink channel transmission repetition of the uplink channel transmission with inter-slot bundling and frequency hopping and based on the bundling information and the RV information. For example, the base station 105 may receive a second PUSCH or PUCCH transmission, as described with reference to FIGS. 4-7B.

In some implementations, the uplink channel repetition is part of the same bundle as the uplink channel transmission. In other implementations, the uplink channel repetition is part of a different bundle and one or more other repetition transmissions occur between 902 and 903. For example, the base station 105 may receive a second bundled transmission based on the bundling information and the RV information. To illustrate, the base station 105 may receive multiple PUSCH or PUCCH transmissions in sequential slots as a second bundle, as described with reference to FIGS. 4-7B. In some implementations, the second bundle has a second RV for each transmission and each second transmission occurs in a corresponding spot and via a same BWP and frequency. The second bundle has a different frequency than the first bundle and is in a different BWP than the first bundle. The base station 105 may determine a re-tuning time and account for such re-tuning time as described in FIGS. 6A-7B.

The wireless communication device (e.g., such as UE or base station) may execute additional blocks (or the wireless communication device may be configured further perform additional operations) in other implementations. For example, the wireless communication device may perform one or more operations described above. As another example, the wireless communication device may perform one or more aspects as described with reference to FIG. 8.

In a first aspect, the base station further: combines signals of uplink channel data of the uplink channel transmission; decodes a combined signal to generate the uplink channel data; and transmits a downlink channel transmission indicating to cease transmission of future planned uplink channel transmission repetitions based on successfully decoding the combined signal.

In a second aspect, alone or in combination with the first aspect, the wireless communication device further: receives an uplink channel transmission repetition with inter-slot bundling and frequency hopping; combines signals of uplink channel data of the uplink channel transmission and the uplink channel transmission repetition; decodes a combined signal to generate the uplink channel data; and transmits a downlink channel transmission indicating to cease transmission of future planned uplink channel transmission repetitions based on successfully decoding the combined signal.

In a third aspect, alone or in combination with one or more of the above aspects, the combining the signals includes combining symbols of the signals.

In a fourth aspect, alone or in combination with one or more of the above aspects, the combining the symbols includes combining in-phase signal portions together and combining quadrature signal portions together.

Accordingly, wireless communication devices may perform inter-slot bundling and frequency hopping operations. By performing inter-slot bundling and frequency hopping operations coverage and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 1-11 may comprise processors, electronics devices, hardware devices, electronics components, logical circuits, memories, software codes, firmware codes, etc., or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving, by a wireless communication device, a message indicating inter-slot bundling for uplink channel inter-bandwidth part (BWP) frequency hopping repetitions;
   receiving, by the wireless communication device, bundling information and redundancy value (RV) information for an uplink channel transmission and corresponding uplink channel transmission repetitions;
   transmitting, by the wireless communication device, the uplink channel transmission in a first bundled transmission with inter-slot bundling and frequency hopping and based on the bundling information and the RV information; and
   transmitting, by the wireless communication device, an uplink channel transmission repetition of the uplink channel transmission in a second bundled transmission with inter-slot bundling and frequency hopping and based on the bundling information and the RV information, wherein the second bundled transmission comprises a second set of multiple repetitions of uplink channel data of the uplink channel transmission over two or more second slots, and wherein the uplink channel transmission repetition has a different frequency than the uplink channel transmission.

2. The method of claim 1, wherein each repetition of the second set of multiple repetitions comprises a single slot, and wherein the second set of multiple repetitions are separated from an adjacent group of multiple repetitions by a frequency offset.

3. The method of claim 1, wherein the first bundled transmission comprises the uplink channel transmission and a first set of multiple repetitions of uplink channel data of the uplink channel transmission over two or more first slots.

4. The method of claim 3, wherein each repetition of the first bundled transmission has a first RV, and wherein each repetition of the second bundled transmission a second RV different from the first RV.

5. The method of claim 3, wherein the uplink channel transmission comprises a Physical Uplink Shared Channel (PUSCH) transmission.

6. The method of claim 3, wherein the uplink channel transmission comprises a Physical Uplink Control Channel (PUCCH) transmission.

7. The method of claim 1, wherein the bundling information indicates a resource block (RB) offset, a bundling size, a BWP index, a number of repetitions, or a combination thereof.

8. The method of claim 1, further comprising:
determining, by the wireless communication device, a BWP hopping pattern for the uplink channel transmission and repetitions based on configuration information included in the message.

9. The method of claim 1, wherein the bundling information is included in a second message, and further comprising:
determining, by the wireless communication device, a BWP hopping pattern for the uplink channel transmission and repetitions based on the bundling information.

10. The method of claim 1, wherein the message is a Radio Resource Control (RRC) message, and wherein the RRC message indicates a BWP hopping pattern.

11. The method of claim 10, further comprising:
receiving, by the wireless communication device, downlink control information (DCI) indicating a hopping flag which indicates to use the BWP hopping pattern of RRC message.

12. The method of claim 1, the message is a RRC message, and wherein the RRC message indicates a list of BWP hopping patterns and, further comprising:
receiving, by the wireless communication device, downlink control information (DCI) including a BWP pattern index which indicates a particular BWP hopping pattern of the list BWP hopping patterns.

13. The method of claim 12, wherein the RRC message further indicates an active BWP.

14. An apparatus configured for wireless communication, comprising:
at least one processor; and
a memory coupled to the at least one processor,
wherein the at least one processor is configured to execute instructions stored on the memory that cause the apparatus to:
receive a message indicating inter-slot bundling for uplink channel inter-bandwidth part (BWP) frequency hopping repetitions;
receive bundling information and redundancy value (RV) information for an uplink channel transmission and corresponding uplink channel transmission repetitions;
transmit the uplink channel transmission in a first bundled transmission with inter-slot bundling and frequency hopping and based on the bundling information and the RV information; and
transmit, an uplink channel transmission repetition of the uplink channel transmission in a second bundled transmission with inter-slot bundling and frequency hopping and based on the bundling information and the RV information, wherein the second bundled transmission comprises a second set of multiple repetitions of uplink channel data of the uplink channel transmission over two or more second slots, and wherein the uplink channel transmission repetition has a different frequency than the uplink channel transmission.

15. The apparatus of claim 14, wherein the processor is further configured to:
generate a re-tuning time for uplink channel transmission repetitions;
generate an uplink channel transmission repetition by using symbol puncturing to allow for the re-tuning time;
re-tune a filter to switch BWPs; and
transmit the uplink channel transmission repetition via a BWP different from a BWP of the uplink channel transmission.

16. The apparatus of claim 14, wherein the processor is further configured to:
generate a re-tuning time for uplink channel transmission repetitions;
generate an uplink channel transmission repetition by using rate matching to allow for the re-tuning time;
re-tune a filter to switch BWPs; and
transmit the uplink channel transmission repetition via a BWP different from a BWP of the uplink channel transmission.

17. The apparatus of claim 16, wherein the rate matching is performed based on a number of symbols for re-tuning, a starting symbol, and a number of symbols.

18. The apparatus of claim 17, wherein the re-tuning time is determined as a number of symbols for re-tuning, and wherein the number of symbols for re-tuning is determined based on subcarrier spacing (SCS).

19. The apparatus of claim 17, wherein if the starting symbol is less than the number of symbols for re-tuning, then:
the starting symbol is updated to the number of symbols for re-tuning, and
the number of symbols is updated to a difference of the number of symbols minus a difference of the number of symbols for re-tuning minus the starting symbol of an upcoming repetition.

20. The apparatus of claim 14, wherein the processor is further configured to:
receive a downlink transmission indicating to cease transmission of the uplink channel transmission repetitions prior to transmission of a number of indicated repetitions; and
cease transmission of the uplink channel transmission repetitions.

21. The apparatus of claim 14, wherein the processor is further configured to:
determine a starting resource block (RB) for each transmission based on bundle size information and an index of repetitions.

22. A method of wireless communication comprising:
transmitting, by a wireless communication device, a message indicating inter-slot bundling for uplink channel inter-BWP frequency hopping repetitions;
transmitting, by the wireless communication device, bundling information and redundancy value information for an uplink channel transmission and corresponding uplink channel transmission repetitions;
receiving, by the wireless communication device, the uplink channel transmission in a first bundled transmission with inter-slot bundling and frequency hopping and based on the bundling information and the RV information; and receiving, by the wireless communication device, an uplink channel transmission repetition of the uplink channel transmission in a second bundled transmission with inter-slot bundling and frequency hopping and based on the bundling information and the RV information wherein the second bundled transmission comprises a second set of multiple repetitions of uplink channel data of the uplink channel transmission over two or more second slots, and wherein the uplink channel transmission repetition has a different frequency than the uplink channel transmission.

23. The method of claim 22, further comprising:

combining, by the wireless communication device, signals of uplink channel data of the uplink channel transmission to generate a combined signal;

decoding, by the wireless communication device, the combined signal to generate the uplink channel data; and transmitting, by the wireless communication device, a downlink channel transmission indicating to cease transmission of future planned uplink channel transmission repetitions based on successfully decoding the combined signal.

24. The method of claim 22, further comprising:

receiving, by the wireless communication device, an uplink channel transmission repetition with inter-slot bundling and frequency hopping;

combining, by the wireless communication device, signals of uplink channel data of the uplink channel transmission and the uplink channel transmission repetition to generate a combined signal;

decoding, by the wireless communication device, the combined signal to generate the uplink channel data; and transmitting, by the wireless communication device, a downlink channel transmission indicating to cease transmission of future planned uplink channel transmission repetitions based on successfully decoding the combined signal.

25. The method of claim 24, wherein the combining the signals includes combining symbols of the signals.

26. The method of claim 25, wherein the combining the symbols includes combining in-phase signal portions together and combining quadrature signal portions together.

27. An apparatus configured for wireless communication, comprising:

at least one processor; and a memory coupled to the at least one processor, wherein the at least one processor is configured to execute instructions stored on the memory that cause the apparatus to:

transmit a message indicating inter-slot bundling for uplink channel inter-BWP frequency hopping repetitions;

transmit bundling information and redundancy value information for an uplink channel transmission and corresponding uplink channel transmission repetitions;

receive the uplink channel transmission in a first bundled transmission with inter-slot bundling and frequency hopping and based on the bundling information and the RV information; and receive an uplink channel transmission repetition of the uplink channel transmission in a second bundled transmission with inter-slot bundling and frequency hopping and based on the bundling information and the RV information, wherein the second bundled transmission comprises a second set of multiple repetitions of uplink channel data of the uplink channel transmission over two or more second slots, and wherein the uplink channel transmission repetition has a different frequency than the uplink channel transmission.

28. The apparatus of claim 27, wherein the message is a configured grant, and wherein the uplink channel transmission and repetitions are indicated by the configured grant.

29. The apparatus of claim 28, wherein the configured grant is a type 1 configured grant and is based on Radio Resource Control (RRC) configuration.

30. The apparatus of claim 28, wherein the configured grant is a type 2 configured grant which is configured by RRC message and which is activated, deactivated, or both, by physical channel communications.

* * * * *